(12) United States Patent
Marques

(10) Patent No.: US 12,103,499 B2
(45) Date of Patent: Oct. 1, 2024

(54) ALL-TERRAIN VEHICLE (ATV) COMPARTMENT FOR WALLET, CELL PHONE, KEYS, MONEY CLIP

(71) Applicant: Robert Joseph Marques, Richmond, KY (US)

(72) Inventor: Robert Joseph Marques, Richmond, KY (US)

( * ) Notice: Subject to any disclaimer, the term of this patent is extended or adjusted under 35 U.S.C. 154(b) by 424 days.

(21) Appl. No.: 17/512,487

(22) Filed: Oct. 27, 2021

(65) Prior Publication Data

US 2022/0306007 A1    Sep. 29, 2022

Related U.S. Application Data

(60) Provisional application No. 63/167,548, filed on Mar. 29, 2021.

(51) Int. Cl.
| | | |
|---|---|---|
| *B60R 9/06* | (2006.01) | |
| *B60R 7/04* | (2006.01) | |
| *B60R 11/00* | (2006.01) | |

(52) U.S. Cl.
CPC .................. *B60R 9/06* (2013.01); *B60R 7/04* (2013.01); *B60R 11/00* (2013.01); *B60R 2011/004* (2013.01); *B60R 2011/0059* (2013.01)

(58) Field of Classification Search
CPC ....................................................... B60R 9/06
See application file for complete search history.

(56) References Cited

U.S. PATENT DOCUMENTS

| | | | | |
|---|---|---|---|---|
| 5,064,016 | A * | 11/1991 | Iwai ....................... | B62K 19/46 180/215 |
| 5,573,162 | A * | 11/1996 | Spencer .................... | B62J 9/27 224/430 |
| 6,145,719 | A * | 11/2000 | Robert ..................... | B60R 7/14 224/435 |
| 6,209,941 | B1 * | 4/2001 | Cross ........................ | B62J 9/23 224/572 |
| 6,425,510 | B1 * | 7/2002 | King ....................... | B60R 9/065 D12/423 |
| 7,128,341 | B1 | 10/2006 | Dahl | |
| 8,646,668 | B2 * | 2/2014 | Oakes ..................... | B60R 9/065 224/539 |
| 9,399,434 | B2 * | 7/2016 | Kennedy ................ | B25H 3/022 |
| 10,406,986 | B2 * | 9/2019 | Roy ........................ | B60R 7/043 |
| 10,661,720 | B2 * | 5/2020 | Drnek .................... | B65D 25/20 |

(Continued)

OTHER PUBLICATIONS

Motorcycle Products, New ATV Diamond Plate Front Aluminum Toolbox Tool Box, Retrieve on Oct. 27, 2021, Retrieve from Internet <https://www.pinterest.com/pin/396527942168200405/>.

(Continued)

*Primary Examiner* — Brian D Nash

(57) ABSTRACT

A protective compartment for off-road vehicles is presented. The protective compartment for off-road vehicles secures to any off-road vehicle, providing a means to carry loose articles during an off-road drive that would normally be lost or damaged during transit. The protective compartment for off-road vehicles contains a case body, a case lid, and at least one fastening element. The case body contains a mount receiver and a storage cavity. The case lid contains at least one fastening slot. The case lid is connected adjacent to the case body through the at least one fastening element.

11 Claims, 5 Drawing Sheets

(56) References Cited

U.S. PATENT DOCUMENTS

| | | | | |
|---|---|---|---|---|
| 10,875,462 B2* | 12/2020 | Chapdelaine | ........... | B60R 9/065 |
| 11,718,240 B2* | 8/2023 | Kelso | ......................... | B60R 9/06 |
| | | | | 180/233 |
| 11,731,722 B2* | 8/2023 | Louden | ...................... | B62J 9/27 |
| | | | | 224/412 |

OTHER PUBLICATIONS

Camco, Black Boar ATV/UTV Large Rear Lounger Seat, Retrieve on Oct. 27, 2021, Retrieve from Internet <https://www.walmart.com/ip/Camco-Black-Boar-ATV-UTV-Large-Rear-Lounger-Seat-Storage-Box-with-Lock-and-Keys-Durable-Water-and-Dust-Resistant-Design-Black-66010/54804212>.

Wydale ATV Tool Boxes WT3039, Retrieve on Oct. 27, 2021, Retrieve from Internet <https://frielatvsales.com/products/wydale-atv-tool-boxes>.

KEMiMOTO Official Store, ATV Rear Rack Bag Package Storage, Retrieve on Oct. 27, 2021, Retrieve from Internet <https://www.aliexpress.com/i/4000193007251.html>.

ATV Front Rack Tool Box, Retrieve on Oct. 27, 2021, Retrieve from Internet <https://www.solwayfeeders.com/gamekeeping-accessories/atv-equipment/atv-front-rack-tool-box-p1355-c366/>.

* cited by examiner

ALL-TERRAIN VEHICLE (ATV) COMPARTMENT FOR WALLET, CELL PHONE, KEYS, MONEY CLIP

The current application claims a priority to the U.S. Provisional Patent application Ser. No. 63/675,548 filed on Mar. 29, 2021.

FIELD OF THE INVENTION

The present invention relates generally to storage compartments, specifically storage compartments specifically designed for safe storage along an off-road vehicle.

BACKGROUND OF THE INVENTION

All-Terrain Vehicles (ATVs) and/or off-road vehicles are popular within the United States. A variety of vehicles from two-wheelers, three-wheelers and four-wheelers is widely available to the public. All ATVs and similar vehicles always include a frame, or a rod-like structure due to the nature of the manufacturing process and assembly. The present invention aims to use the natural shape and features of ATVs and similar vehicles in order to provide a protective case that is specifically design for storage and for safe and easy mounting to an ATV or similar vehicle.

Typically, a remote area or an off-road location is required when riding an ATV or similar vehicle. When making trips out to these remote locations, various equipment and gear is needed. At times, too much equipment might be available or packed into one place. Therefore, it is key to have certain objects ready and at-hand for use in case if needed. The first solution to this problem is placing the needed objects in pant's pockets or some similar storage place. Unfortunately, due to the nature of ATV riding, it is possible to lose objects during a ride. Therefore, storing needed objects in pant's pockets or similar storage place results unsafe and unreliable.

Thus, the present invention aims to provide a solution for storage of objects, equipment or apparatuses needed during an ATV ride or similar activity, while utilizing the components, surfaces and features that ATVs and similar vehicles comprise. The following document aims to provide an accurate and detailed description of the present invention without limiting the scope of the invention, and the accompanying figures are only intended to help illustrate the present invention. Thus, the accompanying figures do not limit the scope of the invention in any way, shape or form.

SUMMARY OF THE INVENTION

The present invention is a protective compartment for off-road vehicles. The protective compartment for off-road vehicles secures to any off-road vehicle, providing a means to carry loose articles during an off-road drive that would normally be lost or damaged during transit. Additionally, the protective compartment can further carry parts and tools suitable for field repairs, such as additional sparkplugs, tire repair kits, ratchets, wrenches, sockets, pliers, hammers, or any other suitable parts and tools. Furthermore, the protective compartment can serve as a carrying case for medical and first aid items, such as, but not limited to epi-pens, bandages, or any other medical items. The protective compartment for off-road vehicles comprises a case body, a case lid, and at least one fastening element. The case body comprises a mount receiver and a storage cavity. The case lid comprises at least one fastening slot. The case lid is connected adjacent to the case body through the at least one fastening element. In the preferred embodiment of the present invention, the case lid to case body fitment is precise, such that the case lid and the case body are press fit together to seal and secure a user article stored within the storage cavity. In the preferred embodiment of the present invention, the user article may take the form of loose items that are prone to being lost or damaged during an off-road ride. These user articles may take the form of mobile devices, keys, wallets, or any other loose articles that may be desired to store within the protective compartment for off-road vehicles.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a protective compartment for off-road vehicles 1, as shown in FIGS. 1-5. The protective compartment for off-road vehicles 1 secures to any off-road vehicle, providing a means to carry loose articles during an off-road drive that would normally be lost or damaged during transit. Additionally, the protective compartment for off-road vehicles 1 can further carry parts and tools suitable for field repairs, such as additional sparkplugs, tire repair kits, ratchets, wrenches, sockets, pliers, hammers, or any other suitable parts and tools. The protective compartment for off-road vehicles 1 can also serve as a carrying case for medical and first aid items, such as, but not limited to epi-pens, bandages, or any other medical items. Furthermore, when mounted on vehicle steering bars, handlebars triple clamp, or the like, the protective compartment for off-road vehicles 1 can also serve as a protective buffer, facilitating as a chest pad, chin protector, or any other safety device implement, protecting the user from impact trauma in the event of a bodily collision along the vehicle steering bar, handlebar, or the like. The protective compartment for off-road vehicles 1 comprises a case body 11, a case lid 12, and at least one fastening element 13.

Figure 1:
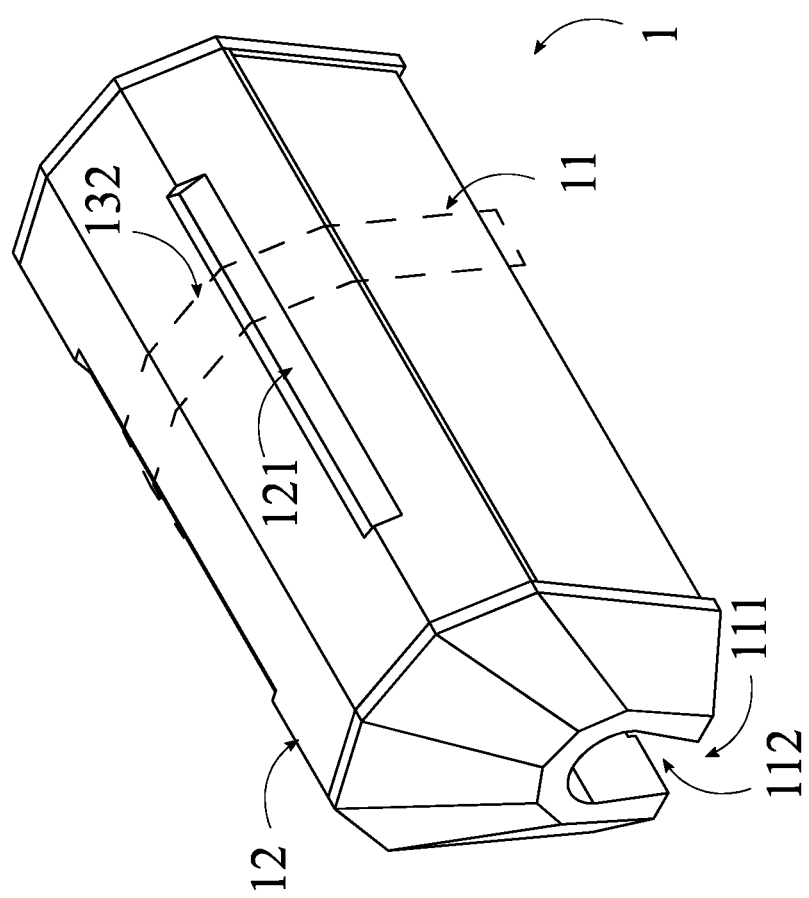
FIG. 1 is a top perspective view of the present invention.
Figure 2:
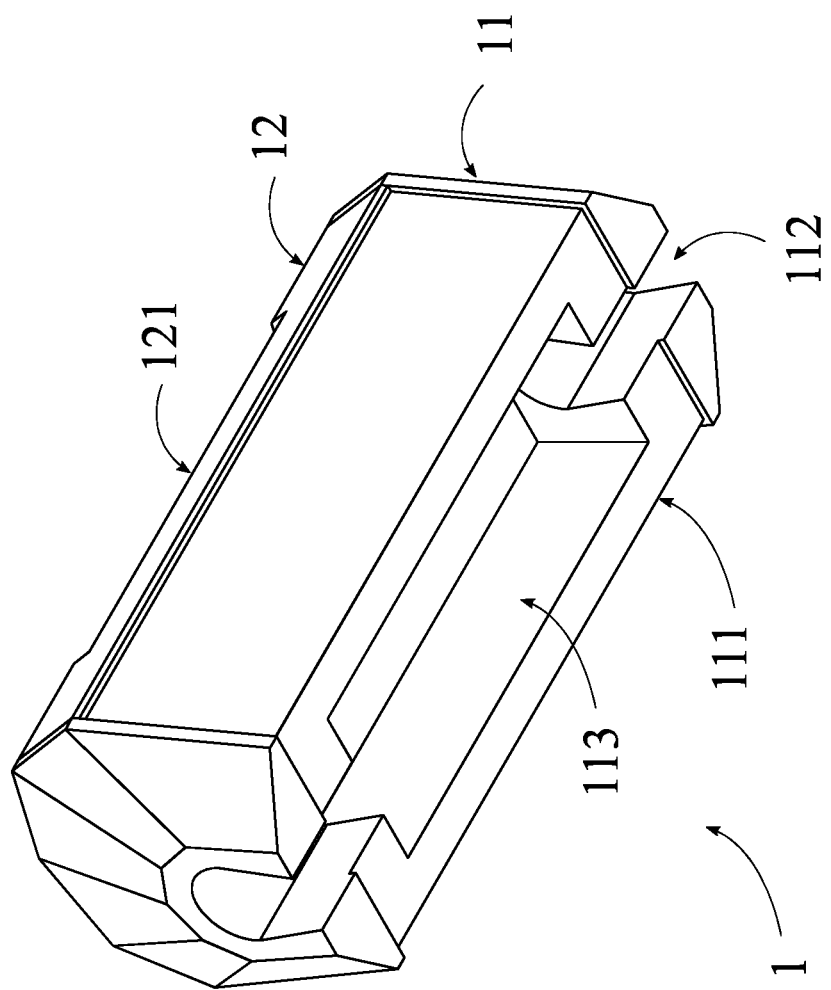
FIG. 2 is a bottom perspective view of the present invention.
Figure 3:
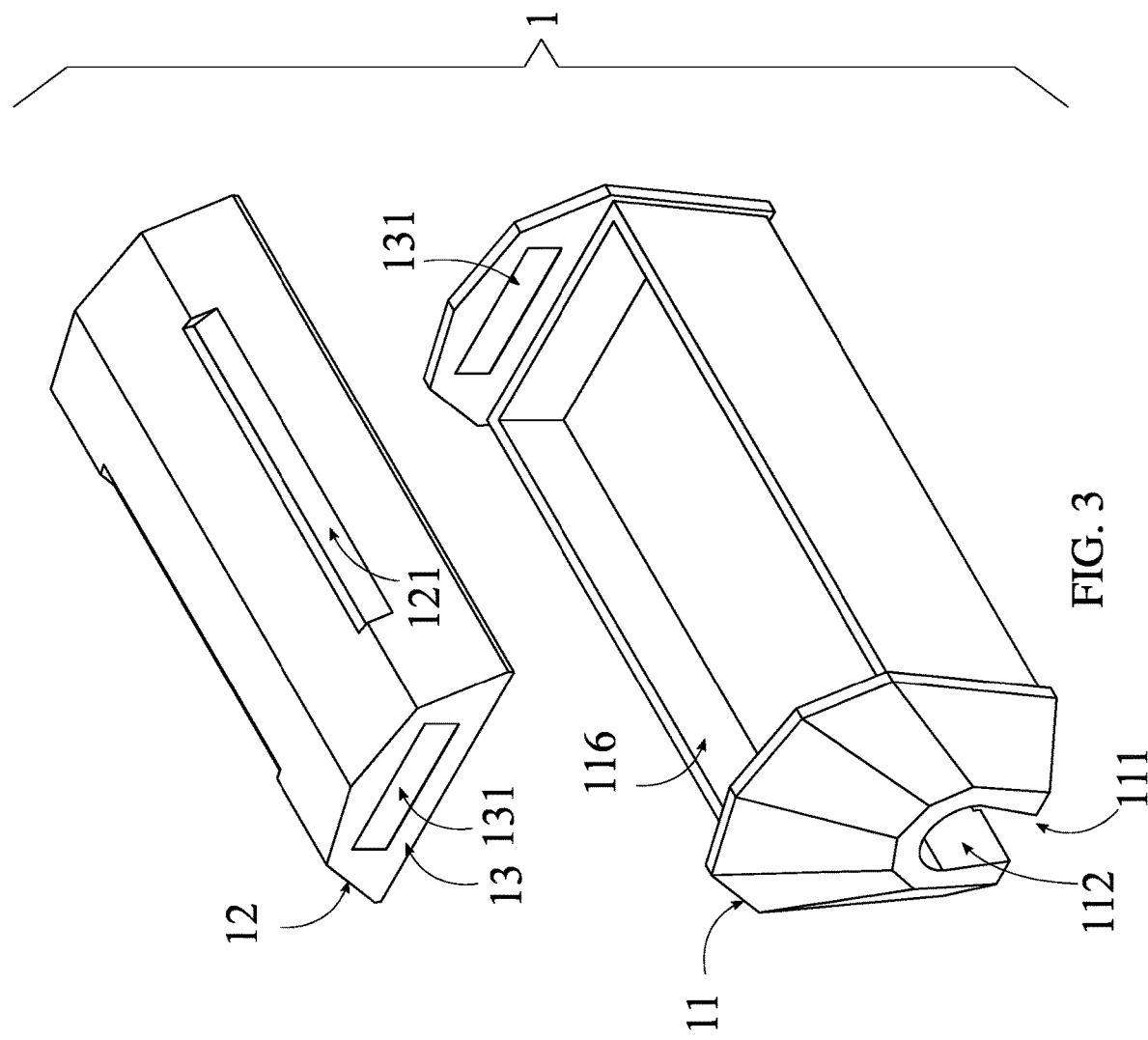
FIG. 3 is an exploded view of the present invention.

In reference to FIGS. 1-5, the case body 11 comprises a mount receiver 111, at least one fastening slot 121, and a storage cavity 116. The case lid 12 further comprises at least one fastening slot 121, as shown in FIGS. 1-3. The case lid 12 is connected adjacent to the case body 11 through the at least one fastening element 13. In the preferred embodiment of the present invention, the case lid 12 to case body 11 fitment is precise, such that the case lid 12 and the case body 11 are press fit together to seal and secure a user article stored within the storage cavity 116. In the preferred embodiment of the present invention, the user article may take the form of loose items that are prone to being lost or damaged during an off-road ride. These user articles may take the form of mobile devices, keys, wallets, or any other loose articles that may be desired to store within the protective compartment for off-road vehicles 1.

In the preferred embodiment of the present invention, the case body 11 and the case lid 12 are made out of a shock-resistant material. In the preferred embodiment of the present invention, the case body 11 and the case lid 12 are made out of a dense foam material. In the preferred embodiment of the present invention, the protective compartment for off-road vehicles 1 is rectangular in shape. In the preferred embodiment of the present invention, the protective compartment for off-road vehicles 1 is cylindrical in shape.

In reference to FIGS. 1-5, the mount receiver 111 is positioned adjacent to the case body 11. In the preferred embodiment of the present invention, the mount receiver 111 serves as the mounting portion of the case body 11, allowing the user to mount the case body 11 along any suitable portion of the off-road vehicle, such as, but not limited to the vehicle handlebar, steering bar, triple clamp, support bars, goosenecks, or any other suitable portion of the vehicle. In the preferred embodiment of the present invention, the off-road vehicle may take the form of motorbikes, ATV's, buggies, bicycles, or any other suitable off-road vehicle. In the preferred embodiment of the present invention, the mount receiver 111 may take the form of a mounting implement that secures the case body 11 to the off-road vehicle mounting bars. In various instances, the mount receiver 111 is adapted to secure on to any suitable portion of any off-road vehicle, such as, but not limited to handlebars, mounting grills, roofs, carriages, or any other suitable portion.

The storage cavity 116 traverses into the case body 11 from the case lid 12 to the mount receiver 111, where the storage cavity 116 is configured to be encapsulated by the case lid 12 in a closed configuration. The at least one fastening slot 121 is distributed about the case lid 12, as shown in FIGS. 1-3. In the preferred embodiment of the present invention, the at least fastening slot serves as additional fastening implement support to secure the case lid 12 to the case body 11, where the at least fastening slot allows a user to strap the case lid 12 to the case body 11 such that the at least fastening slot is configured to prevent the strap from slipping off the lid when placed and tightened along the at least fastening slot.

Figure 5:
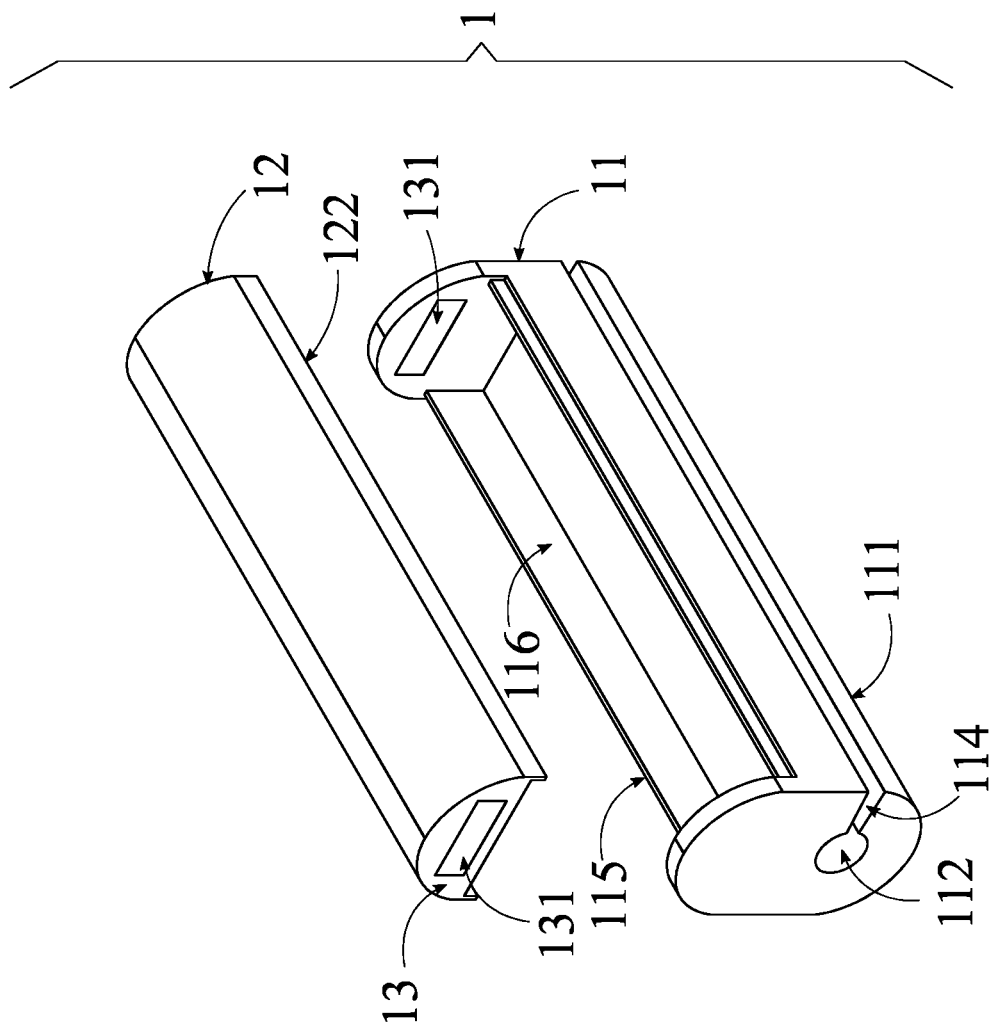
FIG. 5 is an exploded view of the present invention, in accordance with another embodiment.

The at least one fastening element 13 comprises a plurality of first fastening elements 131, as shown in FIGS. 3 and 5. In the preferred embodiment of the present invention, the plurality of first fastening elements 131 secures the case lid 12 to the case body 11. The plurality of first fastening elements 131 is distributed about the case body 11 and the case lid 12, where the plurality of first fastening elements 131 is configured to removably attach the case lid 12 to the case body 11. In the preferred embodiment of the present invention, the plurality of first fastening elements 131 is a magnet fastening element but may take the form of any other suitable fastening element, such as, but not limited to clips, buckles, tabs, screws, or any other suitable fastening element.

The at least one fastening element 13 comprises at least one second fastening element 132, as shown in FIG. 1. In the preferred embodiment of the present invention, the at least one second fastening element 132 provides additional fastening support to secure the case lid 12 to the case body 11. The at least one second fastening element 132 traverses along the at least one fastening slot 121, where the at least one second fastening element 132 is configured to connect the case lid 12 to the case body 11 along the at least one fastening slot 121. In the preferred embodiment of the present invention, the at least one second fastening element 132 is a strap fastener but may take the form of any other suitable fastening implement, such as, but not limited to bungee straps, ratchet straps, tie downs, or any other suitable fastening implement.

The mount receiver 111 comprises a mounting channel 112, as shown in FIGS. 1-5. The mounting channel 112 traverses through the case body 11 along the mounting receiver. In the preferred embodiment of the present invention, the mounting channel 112 is fitted along the mounting bars of the off-road vehicle, facilitating mounting and connection of the case body 11 to the off-road vehicle.

The mount receiver 111 comprises a mounting cavity 113, as shown in FIG. 2. The mounting cavity 113 traverses within the case body 11, opposite to the storage cavity 116. In the preferred embodiment of the present invention, the mounting receiver is fitted along a mounting implement of the off-road vehicle providing additional stability and securement of the case body 11 to the off-road vehicle, working in conjunction with the mounting channel 112. In the preferred embodiment of the present invention, the mounting implement may take the form of a mounting block outfitted along the off-road vehicle, where the mounting cavity 113 is configured to fit and secure along the mounting block.

Figure 4:
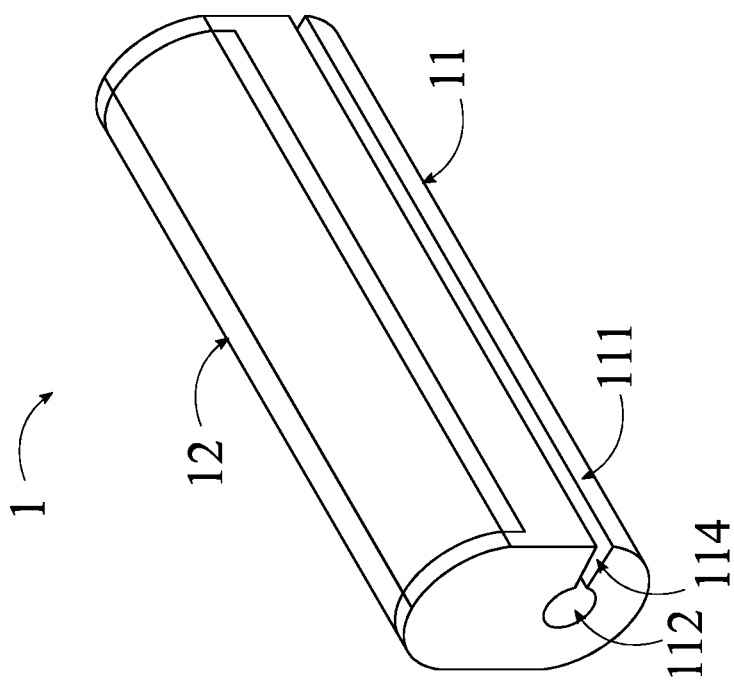
FIG. 4 is a top perspective view of the present invention, in accordance with another embodiment.

In another embodiment of the present invention, the case lid 12 further comprises at least one first connection tab 122, as shown in FIGS. 4-5. The case body 11 further comprises at least one second connection tab 115. The at least one first connection tab 122 traverses along the case lid 12. The at least one second connection tab 115 traverses along the case body 11. Each of the at least one first connection tab 122 is connected to each of the at least one second connection tab 115, where the at least one first connection tab 122 and the at least one second connection tab 115 are configured to secure the case lid 12 to the case body 11. In this embodiment, the at least one first connection tab 122 and the at least one second connection tab 115 serves as interlocking connection implements the further secures the case lid 12 to the case body 11.

In another embodiment of the present invention, the mount receiver 111 further comprises a mounting notch 114, as shown in FIGS. 4-5. The mounting notch 114 traverses through the case body 11 along the mounting receiver. In this embodiment, the mounting notch 114 serves as an opening along the mounting channel 112 that allows the user to clamp fit the case body 11 along the mounting bar of the off-road vehicle.

Although the invention has been explained in relation to its preferred embodiment, it is to be understood that many other possible modifications and variations can be made without departing from the spirit and scope of the invention as hereinafter claimed.

What is claimed is:

1. A protective compartment for off-road vehicles comprising:
   a case body;
   a case lid;
   at least one fastening element;
   the case body comprising a mount receiver and a storage cavity;
   the case lid comprising at least one fastening slot;
   the case lid being connected adjacent to the case body through the at least one fastening element;
   the mount receiver being positioned adjacent to the case body, opposite to the case lid;
   the storage cavity traversing into the case body from the case lid to the mount receiver, wherein the storage cavity is configured to be encapsulated by the case lid in a closed configuration;
   the at least one fastening slot being distributed about the case lid;
   the mount receiver comprising a mounting channel and a mounting cavity;
   the mounting channel traversing through the case body along the mounting receiver; and
   the mounting cavity traversing within the case body, opposite to the storage cavity.

2. The protective compartment for off-road vehicles as claimed in claim 1 comprising:
   the at least one fastening element comprising a plurality of first fastening elements; and
   the plurality of first fastening elements being distributed about the case body and the case lid, wherein the plurality of first fastening elements is configured to removably attach the case lid to the case body.

3. The protective compartment for off-road vehicles as claimed in claim 2, wherein the plurality of first fastening elements is a magnet fastening element.

4. The protective compartment for off-road vehicles as claimed in claim 1 comprising:
   the at least one fastening element comprising at least one second fastening element; and
   the at least one second fastening element traversing along the at least one fastening slot, wherein the at least one second fastening element is configured to connect the case lid to the case body.

5. The protective compartment for off-road vehicles as claimed in claim 4, wherein the at least one second fastening element is a strap fastener.

6. The protective compartment for off-road vehicles as claimed in claim 1 comprising:
   the case lid comprising at least one first connection tab;
   the case body further comprising at least one second connection tab;
   the at least one first connection tab traversing along the case lid;
   the at least one second connection tab traversing along the case body; and
   each of the at least one first connection tab being connected to each of the at least one second connection tab, wherein the at least one first connection tab and the at least one second connection tab are configured to secure the case lid to the case body.

7. The protective compartment for off-road vehicles as claimed in claim 1 comprising:
   the mount receiver further comprising a mounting notch; and
   the mounting notch traversing through the case body along the mounting receiver.

8. The protective compartment for off-road vehicles as claimed in claim 1, wherein the case body and the case lid are made out of a shock-resistant material.

9. The protective compartment for off-road vehicles as claimed in claim 1, wherein the case body and the case lid are made out of a dense foam material.

10. The protective compartment for off-road vehicles as claimed in claim 1, wherein the protective compartment for off-road vehicles is rectangular in shape.

11. The protective compartment for off-road vehicles as claimed in claim 1, wherein the protective compartment for off-road vehicles is cylindrical in shape.

* * * * *